United States Patent [19]
Bouldin et al.

[11] Patent Number: 5,918,824
[45] Date of Patent: Jul. 6, 1999

[54] DIRECT DRIVE MATERIAL VOLUME REDUCTION APPARATUS

[76] Inventors: Floyd E. Bouldin; Thomas Cantrell, both of Box 7177, 70 Easy St., McMinnville, Tenn. 37110-7177

[21] Appl. No.: 08/839,756

[22] Filed: Apr. 15, 1997

[51] Int. Cl.$^6$ ................................................ B02C 13/28
[52] U.S. Cl. ...................................... 241/186.4; 241/294
[58] Field of Search ...................... 241/101.76, 101.761, 241/101.742, 282.2, DIG. 38, 186.4, 294, 92, 55

[56] References Cited

U.S. PATENT DOCUMENTS

| | | | |
|---|---|---|---|
| 3,979,074 | 9/1976 | White et al. | 241/30 |
| 4,087,051 | 5/1978 | Moeller | 241/55 X |
| 4,485,976 | 12/1984 | White | 241/186.4 X |
| 4,779,810 | 10/1988 | Frey | 241/101.76 X |
| 4,790,489 | 12/1988 | Paul | 241/186.4 X |
| 4,997,135 | 3/1991 | Zehr | 241/101.761 |
| 5,054,703 | 10/1991 | Morey | 241/92 X |
| 5,375,784 | 12/1994 | Worley | 241/101.761 X |
| 5,379,951 | 1/1995 | Hughes | 241/101.761 X |
| 5,402,950 | 4/1995 | Blair et al. | 241/101.76 |

FOREIGN PATENT DOCUMENTS

| | | |
|---|---|---|
| 25687 | 1/1908 | Germany . |
| 1231948 | 1/1967 | Germany . |
| 0266447 | 5/1988 | Germany . |

OTHER PUBLICATIONS

Plana Catalog, 1996.

*Primary Examiner*—Joseph J. Hail, III
*Assistant Examiner*—William Hong
*Attorney, Agent, or Firm*—Rick R. Wascher

[57] ABSTRACT

A material volume reduction apparatus having a frame, a motor supported by the frame, a drum supported by the frame and having an interior and an exterior, a drive shaft operably connected to the motor, a comminuting wheel assembly including a disk like body portion having an axis; and a geared axle assembly operably interpositioned between and connected to the drive shaft and the comminuting wheel assembly to operably support the comminuting wheel assembly within the interior of the drum and to transmit the rotational torque of the motor imparted to the drive shaft and transfer it to the comminuter wheel assembly enabling the comminuter wheel to rotate within the interior of the drum. The geared axle assembly is preferably that of a motorized vehicle of the type found in an over-the-road type diesel truck. The drum may include a substantially cylindrical wall with an open first end and an open second end; and a closure member to at least partially close the second end of the drum. The closure member may further comprise a grate, or a plurality of grate segments, mounted adjacent the second end of the drum. A hub supported by a distal end of an axle portion wherein the hub is configured to enable the comminuter wheel to be attached to it. At least one toothed bracket is secured to the peripheral edge of the wheel. The teeth are preferably formed of a unitary body construction wherein the unitary body is rigidly secured to the bracket.

34 Claims, 12 Drawing Sheets

DIRECT DRIVE MATERIAL VOLUME REDUCTION APPARATUS

BACKGROUND OF THE INVENTION

1. Field of the Invention

The present invention relates generally to machines and apparatuses for grinding, comminuting, shredding, or otherwise reducing the volume of waste materials such as brush, tree limbs, waste lumber, grass, dirt, stumps, logs, etc., and other waste such as sofas, chairs, and other refuse type materials.

The present invention more particularly relates to comminuting apparatuses of the type having a rotatable drum, tub, or vessel component within which a disk-like cutter component is rotated in a plane substantially parallel to the floor of the tub, drum or vessel to enable the material placed inside the drum, tub or vessel to come in contact with the disk like cutter component to cut, shred, tear, break, splinter, or otherwise reduce the volume of the material.

2. Description of the Related Art

The art to which the invention relates includes, for example, disk type bale shredders, comminuting apparatuses, and the like, but not conventional tub grinders that have a drum-like cutting element mounted horizontally and orthogonal to the planar surface of the bottom of the drum. In tub grinders only a portion of the cutting element protrudes up into the tub or vessel leaving the majority of the cutting element below the tub floor.

Most noteworthy of the art to which the invention relates, however, is U.S. Pat. No. 5,739,951 granted to Hughes for a comminuting apparatus. The Hughes patent discloses an apparatus which includes a tub that is rotated to induce circular motion to the material. Simultaneously, a disk position at the bottom of the tub is rotated, preferably in the opposite direction to the tub in a plane parallel to the tub bottom. The disk has independently adjustable teeth positioned thereon to impact the material in the tub at a variety of adjustable attack angles. A screening means in provided in the bottom of the tub to keep the material in the tub until it reaches a desired particle size, at which time the particles can leave the tub through the screening means and enter a collection chamber. The particles are removed from the collection chamber by being entrained in an air stream that passes adjacent to an opening in the collection chamber. The tub and disk are rotated by a pulley and belt arrangement that employs inflatable tires to rotate the tub and allow slippage between the tub and tires when the tub jams with material.

Another apparatus comprising the art to which the invention relates includes the apparatus disclosed in U.S. Pat. No. 4,790,489 granted to Paul for a bale shredder. The Paul apparatus is a bale shredding apparatus including a stationary platform above which is positioned a rotatable bale-receiving tube. An aperture in the platform exposes a rotor which rotates about an axis parallel to and spaced from the axis of rotation of the tub, and the diameter of the rotor is substantially less than the diameter of the tub. Blades carried by the rotor co-act with the bale received by the tub to shred the material of the bale.

As mentioned above with respect to the Hughes device, both the Hughes and Paul references incorporate a drive means for the tub and the disk or rotor, respectively, that incorporates a drive tire and belting arrangement. The belting arrangement and drive wheels or tires act much like a pulley in that the drum, tube, and disk or rotor, are caused to rotate via the tension of the belting around an axles of the drive tire wherein a motor mechanism turns the drive wheel causing the belt, much like a pulley arrangement, to transfer the rotational torque to the component to be turned.

A significant drawback associated with this type of arrangement is the ability to jam the apparatus and cause the pulley-like wheel and belt arrangement to slip on the component being turned. Both of the aforementioned apparatuses, namely Hughes and Paul, tout the ability to slip as a significant improvement and advantage over the existing state-of-the-art at the time those inventions and patent applications were filed.

Until now, a device for grinding, or otherwise reducing the volume of the material placed within a grinder yet is capable of being constructed on a cost-efficient basis, incorporating a direct drive from a motor component, preferably a recycled rear axle assembly from a truck, which is also capable of having a gearing function so that the rotational speed of the grinding elements, such as a rotor, disk, grinder element may be positively controllably gear driven and throttled by virtue of a conventional transmission has not been invented.

SUMMARY OF THE INVENTION

The preferred embodiment of the present invention may be movable by mounting it to a wheeled carriage or trailer-like frame assembly or stationary in that it can be installed on-site in a particular location in a stationary, fixed position. On the frame component are mounted a grinding assembly, motor drive, exit conveyor, as well as an optional knuckle boom for collecting and gathering material.

The grinding assembly may further comprise an optional housing which surrounds and covers a rotating drum component to keep the user or passersby from contacting or coming in contact with the rotating drum. Therefore, within the housing a rotating drum is operably supported by the frame.

The rotating drum is preferably turned by a hydraulic motor assembly by a direct chain drive. The chain drive engages the sprockets of the hydraulic motor assembly which are fed hydraulic power by hydraulic feed lines and pumps such that rotation of the sprocket mounted on the hydraulic motor shaft turns the chain. The turning chain positively engages the drum via a series of tooth components affixed to and projecting from the exterior surface of the drum and entering into the interstices of the chain links. Within the drum, through an aperture in the floor, extends a shaft. The shaft is preferably an extension of a rear gear and axle assembly commonly found in motorized vehicles having rear gear and axles drive trains. The preferred drive assembly is therefore a direct drive component of the present invention is preferably a new or recycled rear axle and associated gear assembly of a truck. The axle assembly is mounted in a vertical fashion on the underlying frame of the preferred embodiment of the invention.

At the distal end of the axle that extends up into the rotatable drum is a hub having its associated threaded studs. The cutting wheel assembly comprises a wheel component preferably formed of solid steel and of significant thickness and integrity to withstand significant impact forces thereon. The cutting wheel is bolted to the hub. The wheel has associated with it a plurality of angled notches around its periphery onto which a tooth assembly is attached. The tooth assembly further comprises a bracket having a large diameter central pin passing between its opposing flanges and is positioned such that the pin rests within the angled notch of the wheel. Conventional bolts secure the bracket to the cutting wheel periphery.

On the tooth bracket a tooth holder with a removable tooth, or preferably a single unitary cutting element welded or otherwise rigidly secured to the bracket. It is believed that the tooth bracket and wheel assembly are particularly novel as is the direct drive gear assembly of the wheel.

The present invention, therefore, may also be summarized as follows: a material volume reduction apparatus, comprising: a frame, a motor supported by the frame, a drum supported by the frame and having an interior and an exterior, a drive shaft operably connected to the motor, and a comminuting wheel assembly including a disk like body portion having an axis; and a geared axle assembly operably interpositioned between and connected to the drive shaft and the comminuting wheel assembly to operably support the comminuting wheel assembly within the interior of the drum and to transmit the rotational torque of the motor imparted to the drive shaft and transfer it to the comminuter wheel assembly enabling the comminuter wheel to rotate within the interior of the drum.

The present invention may also be summarized as follows: a material volume reduction apparatus, comprising a frame, a geared axle assembly supported by the frame and having a hub, drive means for imparting a rotational torque to the geared axle assembly enabling the hub to rotate thereon, a drum supported by the frame and having an interior and an exterior, and a comminuting wheel assembly operably attached to the hub, wherein the comminuting wheel further comprises a disk like body portion having a central axis.

The geared axle assembly is preferably a geared axle assembly of a motorized vehicle, but more particularly, a rear geared axle assembly of an over-the-road type diesel, or a recycled rear geared axle assembly of an over-the-road type diesel truck. The drum preferably includes a substantially cylindrical wall with an open first end and an open second end; and a closure member to at least partially close the second end of the drum. The closure is a grate mounted adjacent the second end of the drum and may comprise a plurality of individual grate segments.

The aforementioned geared axle assembly preferably includes a hub supported by a distal end of an axle portion wherein the hub is configured to enable the comminuter wheel to be attached thereto. The hub of the material volume reduction apparatus preferably further includes at least one stud extending therefrom and configured to receive a fastener; and the comminuter wheel has at least one bore extending through the body portion parallel to the axis thereof and configured to enable the at least one stud to be inserted into the bore and receive a fastener thereby securing the comminuter wheel interpositionally between into the hub and the fastener.

At least one bracket is secured to a peripheral edge of the wheel and configured to support a tooth element. The bracket includes a pair of spaced apart parallel leg members joined together by a cross member wherein the leg members straddle the edge of the comminuter wheel when operably attached thereto. At least one tooth element is preferably secured to the bracket. The comminuter wheel further includes at least one notch formed in the peripheral edge of the wheel, and the bracket further includes a transverse pin interpositioned between the spaced apart leg members. The pin is sized to be received within the at least one notch of the comminuter wheel to which the at least one bracket is operably attached.

The teeth may be a unitary body construction wherein the unitary body is rigidly secured to the bracket, or the teeth may be of a modular configuration. The drum is preferably rotatably supported by the frame, and may turn in either a clockwise or counterclockwise direction, and preferably includes at least one inwardly projecting fin mounted within the interior of the drum below a grate to sweep material passing through the grate to a material exit opening in a bottom of the drum.

It is the object of the present invention to provide a grinding apparatus of a stationary or mobile variety that includes a direct gear drive assembly of the grinding or cutting component of the apparatus.

It is an object of the present invention to provide a grinding apparatus of the stationary or movable type capable of transferring rotational energy directly from a motor to a shaft through a gear and axle assembly to a cutting wheel having cutting elements positioned thereon.

It is an object of the present invention to provide an apparatus for grinding or otherwise reducing the volume of material to be ground through the use of a recycled or new rear axle and associated gear assembly of a motorized vehicle, preferably an over the road diesel truck to transfer rotational energy directly from a motor to a cutting wheel.

It is an object of the present invention to provide a volume-reduction apparatus with a wheel component with a plurality of stationary, fixed cutting teeth mounted on the wheel to grind material.

It is an object of the present invention to provide an apparatus for reducing the volume of material by grinding, cutting, tearing, shredding, breaking, fracturing, and otherwise aggressive contact with a cutting element that rotates in response to rotational directional from a motor via a gear and axle assembly.

These and other objects, features, and advantages of the present invention shall become apparent after consideration of the scope and content of the disclosure set forth herein. All such objects, features, and advantages are considered an inherent part of the present invention although not specifically set forth.

DETAILED DESCRIPTION OF THE PREFERRED EMBODIMENT(S)

Figure 1:
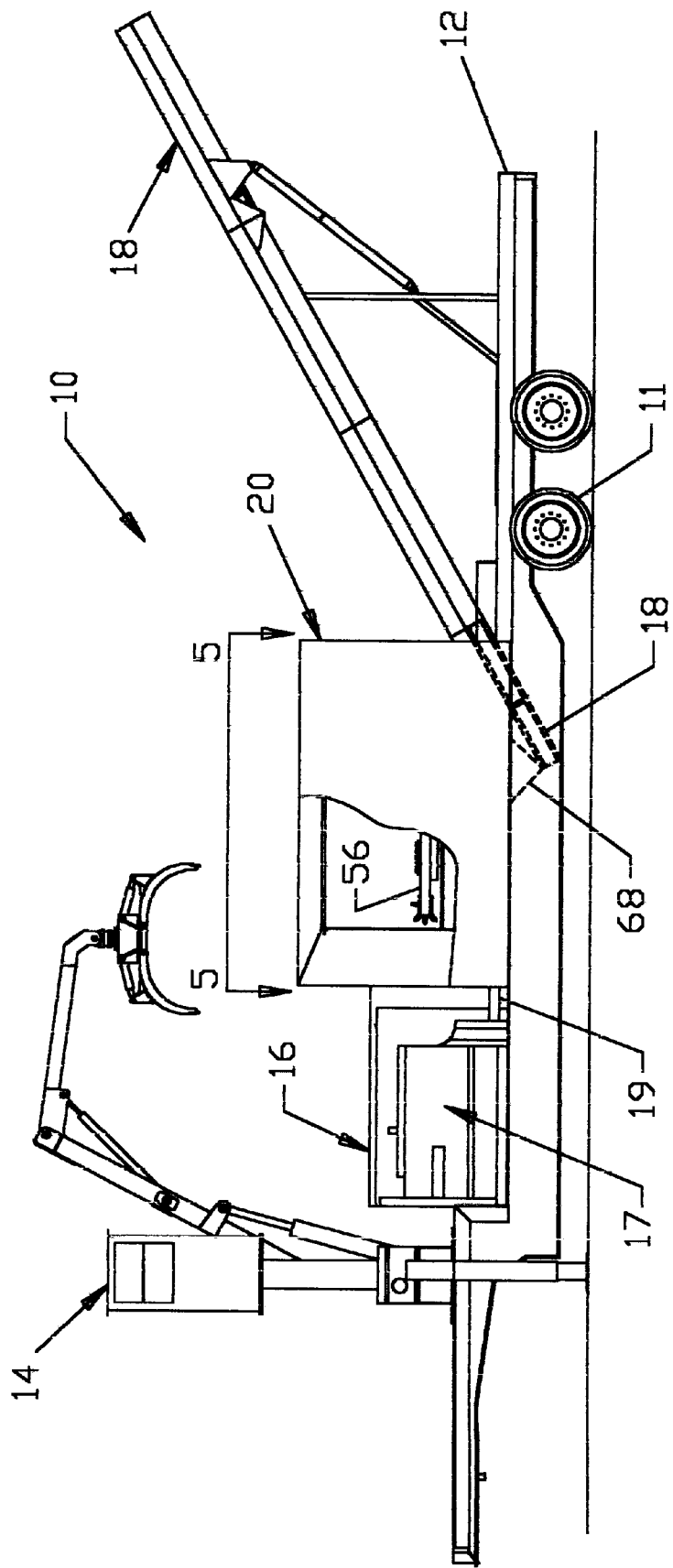
FIG. 1 is a side view of an embodiment of the present invention shown in its mobile form which may be made into a stationary embodiment by removing the wheels therefrom.

With reference to FIG. 1 an embodiment of the invention apparatus, referred to herein as a grinding machine, is designated generally by reference numeral (10). Embodiment (10) is shown as a mobile component and includes wheels (11) supporting a frame (12). In an alternate embodiment (not shown) a stationary or in place apparatus is substantially similar to apparatus designated by the reference numeral (10) in that the wheels (11) are removed and the platform or frame (12) and the unit is supported by the ground surface on which it rests.

Associated with the frame (12) in the preferred embodiment is an optional knuckle boom assembly (14) which is also supported by the frame (12). Engine assembly (16) including a motor designated generally by the reference numeral (17), and an optional conveyor (18) are also supported on the frame. Shaft (19) extends from the motor (17) to a grinding assembly designated generally by the reference numeral (20).

Figure 4:
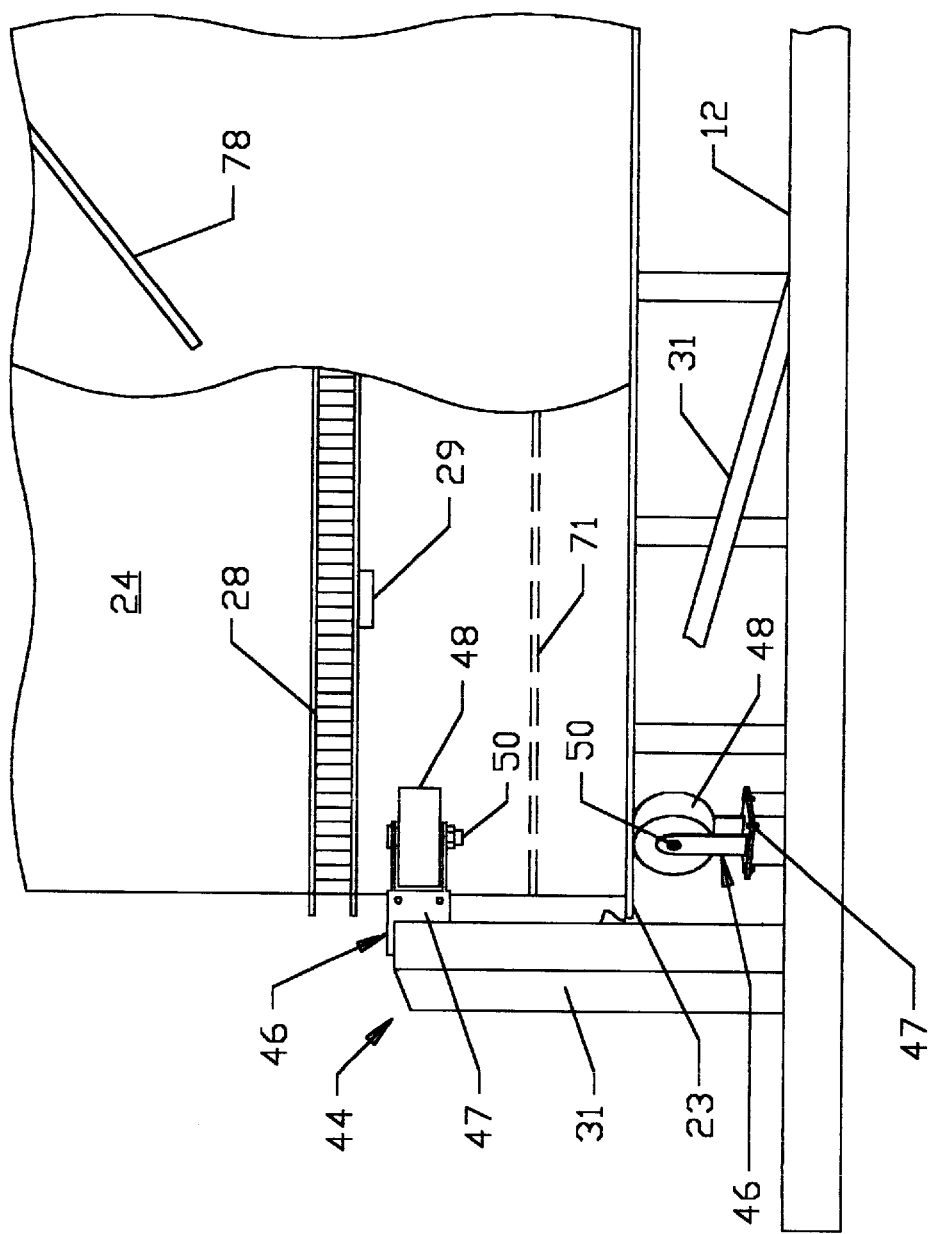
FIG. 4 is an elevated perspective view of a support and centering assembly providing positive support and alignment of a drum component of an embodiment of the present invention.
Figure 5:
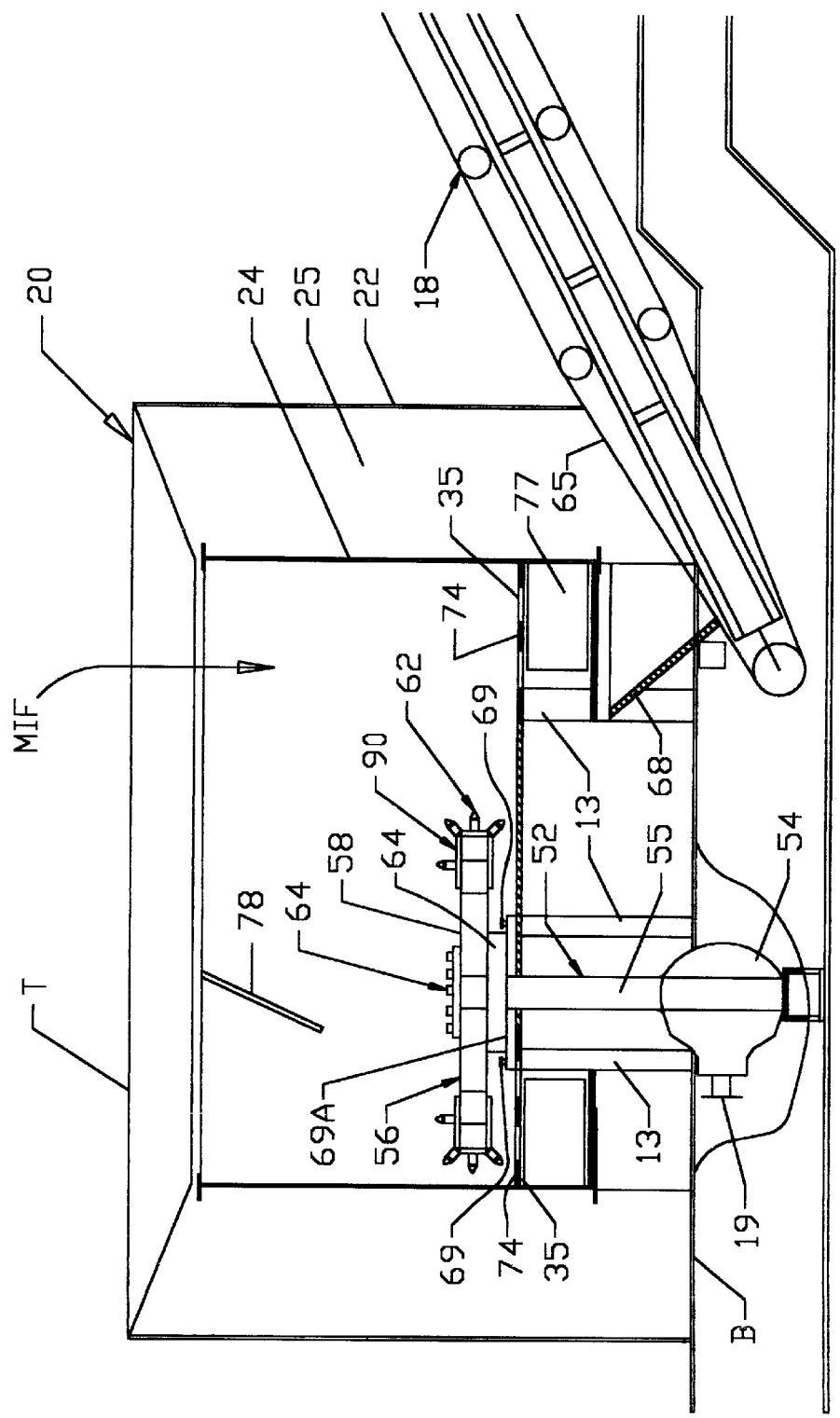
FIG. 5 is a partially cross-sectional side view of the grinding apparatus shown in FIG. 1 and taken along line 5—5 of that figure to reveal an embodiment of the cutting element and an embodiment of the direct drive components of the present invention.

With reference to FIGS. 2 through 5, the grinding apparatus (18) (FIG. 2) includes a housing (22) having a top designated by the letter T and a bottom designated by the letter B (See also FIG. 4). A drum (24) preferably of a cylindrical configuration is rotatably mounted on the frame (12) by a plurality of supports (13) and is driven by a drum drive assembly which is designated generally by the reference numeral (26). The drum (24) has an interior grate floor, designated by the dashed lines of FIGS. 2 and 4 by reference numeral (71). The grate (71) serves as a false bottom to allow ground material to pass through the false bottom (71) (i.e., described below as adjoining grate segments (74)) and enter a material collection well (35) as shown in FIG. 5 prior to discharge from the drum (24) through an opening formed therein. The drum (24) also includes an annular flange (23) which provides a wide surface for the support wheels (48) to hold the drum in an elevated position.

Associated with drive assembly (26) is a chain (28) which surrounds the circumference of the drum (24). The chain (28) is of a size sufficient to securely engage the drum (24) and rotate it in response to energy supplied to it via the drive assembly (26). Chain guides (29) and sprocket elements that engage the chain (not shown) are preferably rigidly secured to the outer surface of the drum (24) to ensure that the chain does not slip along the cylindrical height of the preferably cylindrical drum (24).

The aforementioned drive assembly, further includes a support stand (30). Attached to the support stand in operative orientation is a hydraulic motor (32) having a hydraulic fluid supply line (34) to provide a fluid motive force to the hydraulic motor (32) to enable the shaft (38), held in place by the bearing (36), to rotate in response to the fluid pressure supplied to the motor through the line (34). A shaft (38) extending from the hydraulic motor (32) rotates in response to the applied fluid pressure and causes a sprocket (40) that is fixed to the shaft to turn. Sprocket (40) engages the chain (28), and the chain (28) rotates the drum (24) as described above. Supplemental sprockets (42) are provided when a plurality of hydraulic drive motors (32) are used. Multiple sprockets are interlaced with one another to keep them rotating in tandem in this configuration.

Figure 2:
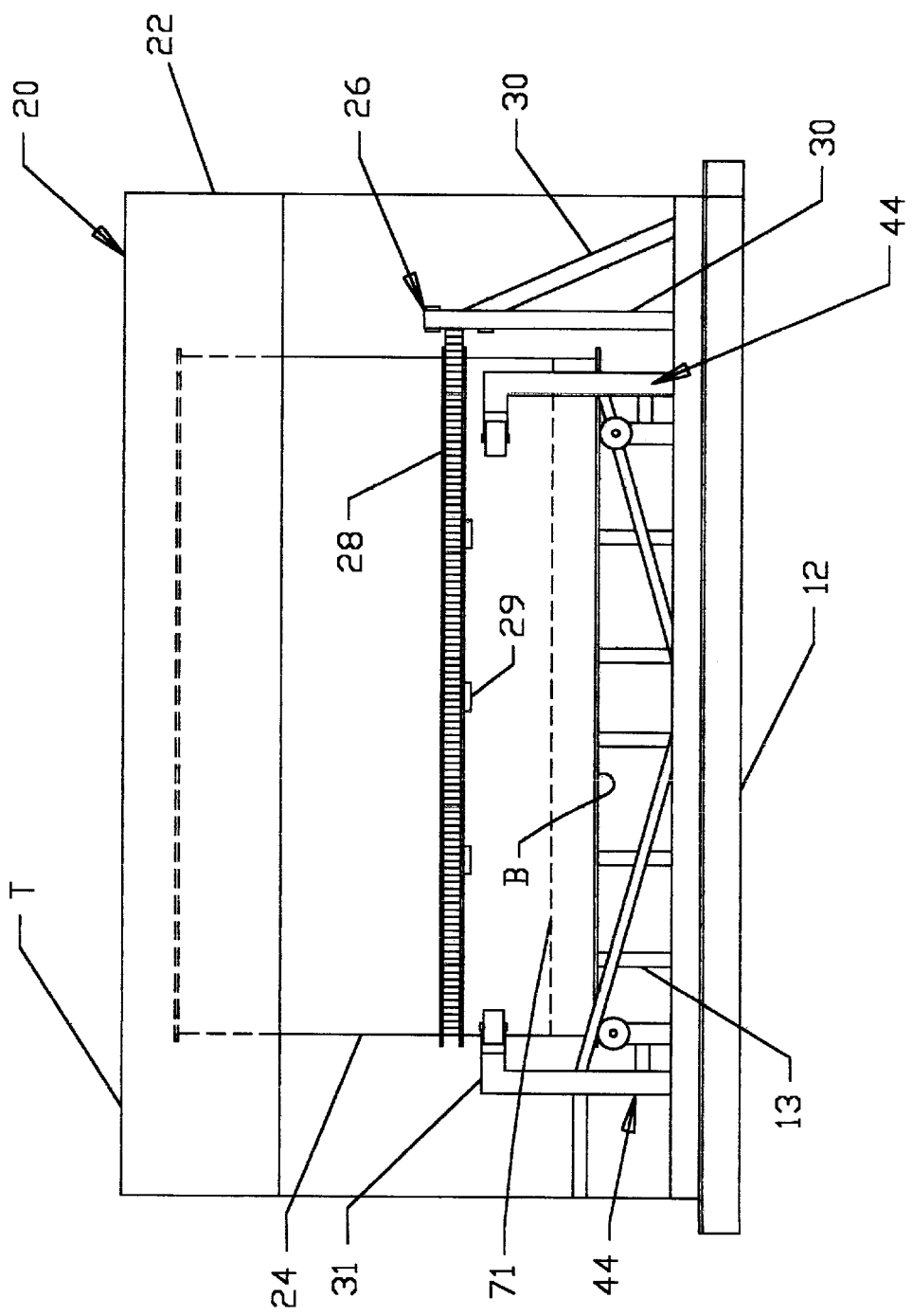
FIG. 2 is a side view of a grinding assembly of the apparatus shown in FIG. 1 with a portion of its housing removed exposing components therein.
Figure 3:
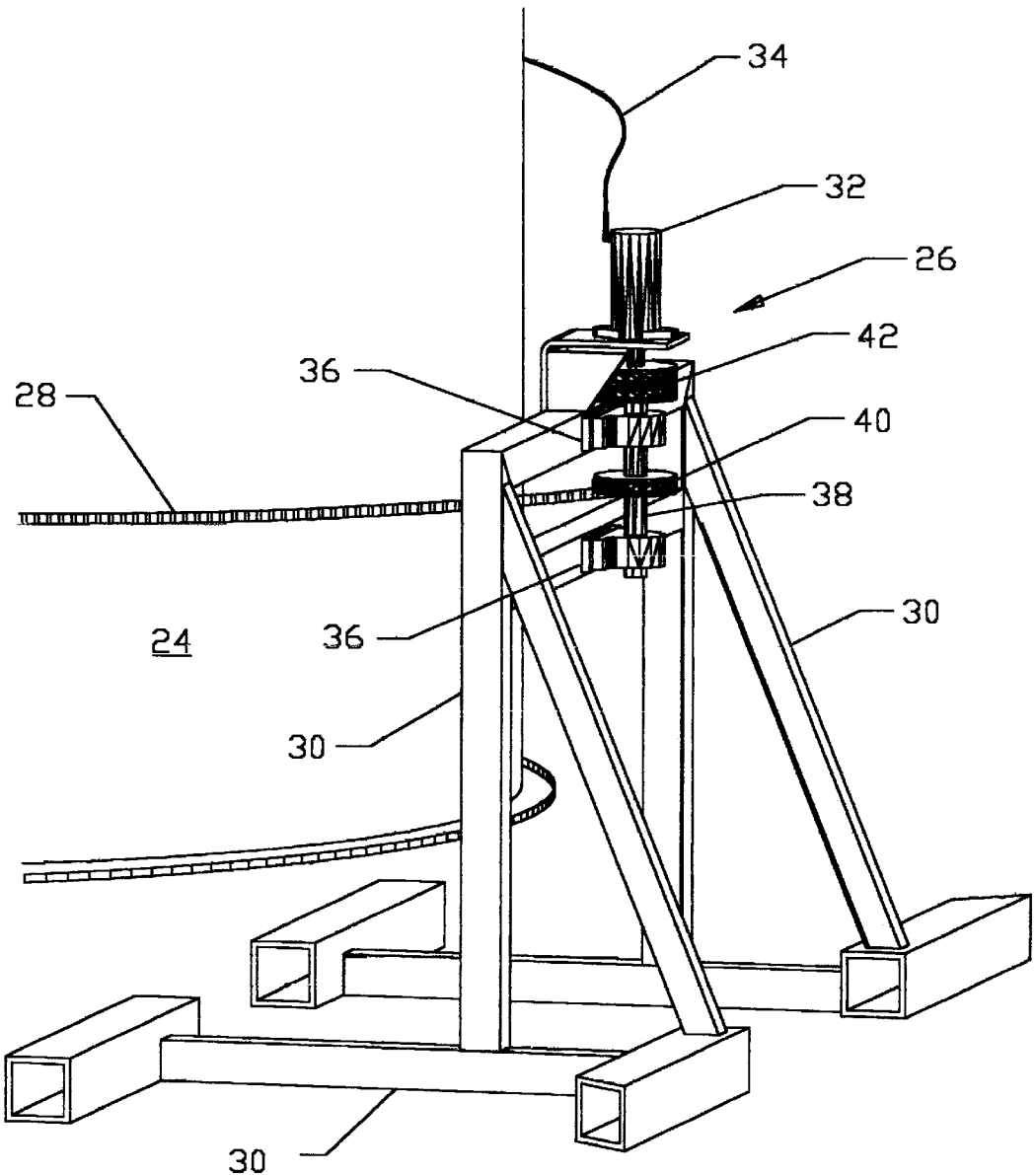
FIG. 3 is an elevated perspective view of a direct chain drive assembly associated with the drum component of an embodiment of the present invention.

With reference to FIGS. 2 and 4, a support assembly (44) is provided to keep the drum (24) in proper operation and rotational alignment above the frame (12) and its supporting frame (13). The support assembly (44) further comprises a plurality of upright supports (31), a plurality of rigid wheeled stabilizing assemblies (46) which include wheeled support brackets (47), rigid wheels (48) which are preferably constructed of a machined aluminum to provide a significant amount of structural integrity, and the previously mentioned annular drum flange (23).

The wheels (48) have axles (50) passing through their center to enable them to turn with respect to the wheel support brackets (47). In combination, one of the wheels (48) is mounted transverse to the drum (24) on its curved exterior side and a second wheel is mounted vertically beneath the bottom surface of the annular rim (23) adjacent the true bottom of the drum. In the preferred embodiment, there are four such wheel supports, one positioned approximately 90 degrees from an adjacent support such that four supports form a rectangle wherein the drum (24) is mounted and resides within its imaginary confines.

With reference to FIG. 5, an embodiment of the grinding assembly (20) is shown with a portion of the housing (22) and drum (24). An axle assembly (52) and its associated bell housing (54), within which is preferably a rear gear assembly (not visible), are positioned and supported by the frame (12). The axle assembly (52) is preferably that found or taken from a rear wheel drive vehicle having a rear axle and gear assembly. In the preferred embodiment a used or recycled rear gear assembly from an over the road diesel or gas operated truck is used. Of course, any such rear axle and associated gear assembly may be used, but a truck assembly was selected to provide the size and torque transmitting capability not found in smaller "rear ends" of other motorized axle-drive vehicles.

An axle (55) extends from the bell housing (54) which has an internal gear system (not shown) and terminates in a distal hub designated generally by reference numeral (64) which is rotatably positioned within the drum (24). A cutting wheel assembly (56) including a disk-like rigid wheel (58), constructed of a hardened steel, is attached to the hub assembly (64) in the manner described herein below.

The wheel (58) further includes removable or fixed tooth brackets (90) mounted at its periphery (only two of which are shown in FIG. 5). A tooth component (62) is rigidly secured or attached to the tooth assembly (90) to prevent movement or adjustability from their pre-determined, pre-selected, fixed orientation even though the brackets (90) may be removed from the wheel (58) to resurface worn teeth (62) after use.

Figure 6:
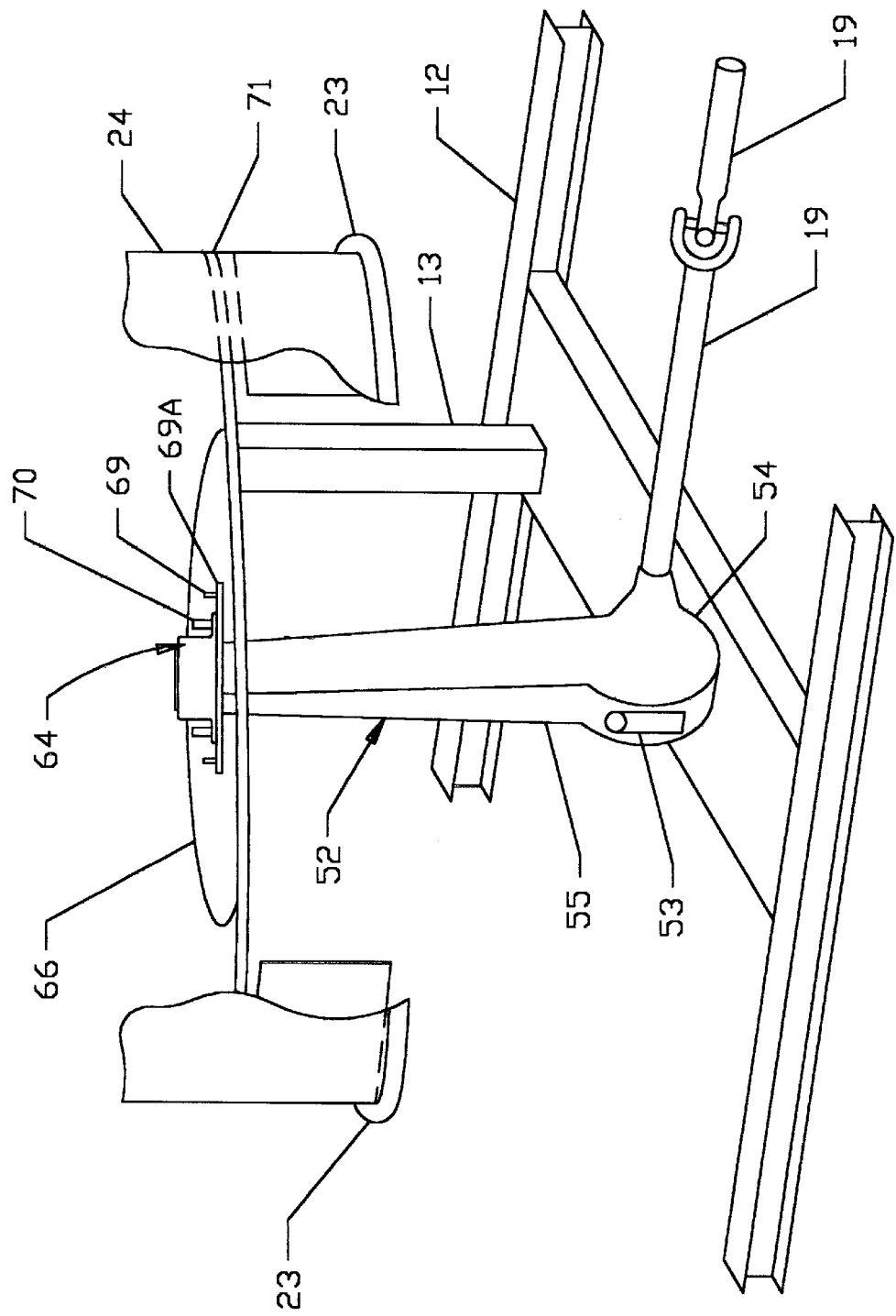
FIG. 6 is an elevated perspective view of an embodiment of the direct drive component from the present invention as shown in FIG. 5.
Figure 7:
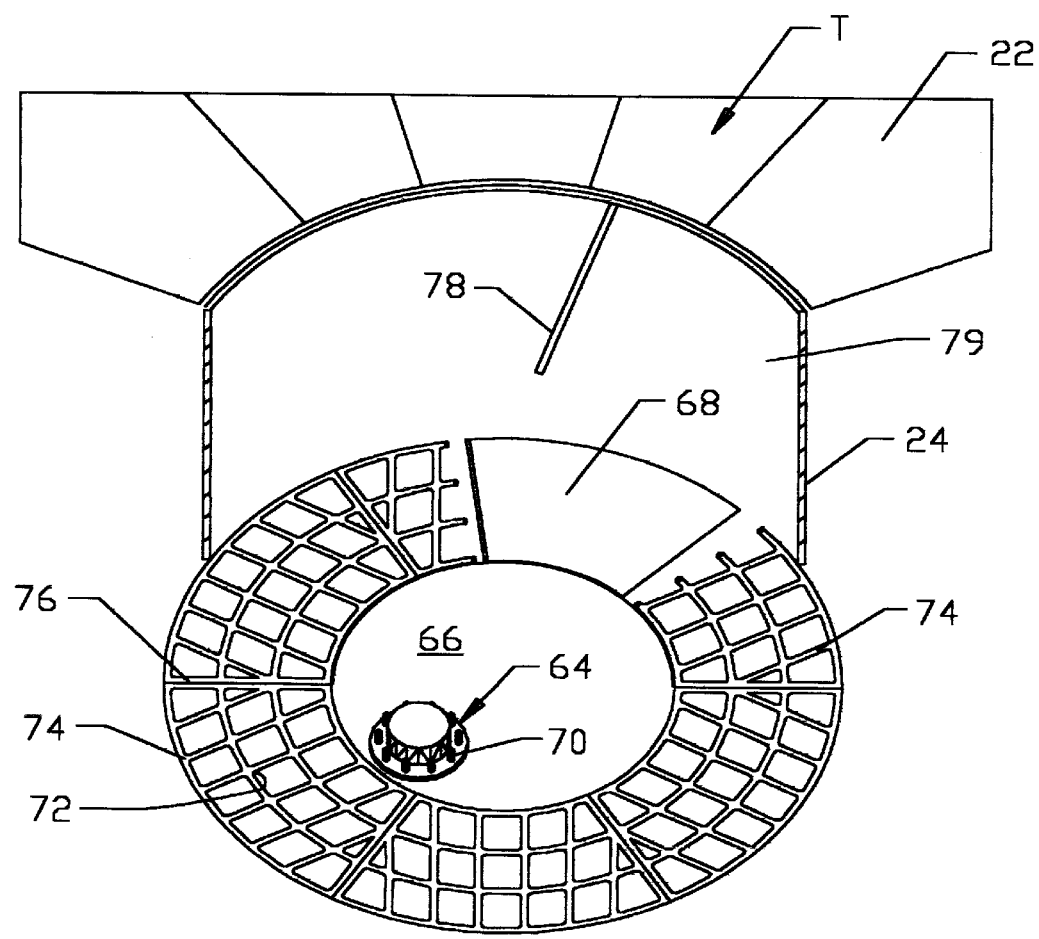
FIG. 7 is an elevated perspective view of the drum portion of the present invention and illustrating its internal components or a portion thereof.

With reference to FIGS. 5, 6, and 7, in combination, the axle assembly (52) is shown interconnected to a drive shaft assembly or drive shaft means (19) (see FIG. 1) and is operably coupled thereto. As noted the axle assembly (52) may be rigidly secured to the frame (12) by any of a variety of conventional means such as bolts, torque delimiting pins (53), welds, etc., or any number or plurality of each. Plate (69A) and fasteners (69) (e.g., bolts) additionally secure the axle (55) to the center floor section (66).

Hub assembly (64) further includes a plurality of threaded studs (70) extending therefrom. The axle (55) therefore projects through an aperture in the center floor section (66), causing the hub (64) to reside within the interior of the drum (24) (best seen in FIG. 7). Exit chute (68) is provided in the grate floor (71) which is partially comprised of a plurality of removable grate segments (74) that are placed in side-by-side relationship as shown and illustrated generally to display a seam (76) existing therebetween. The seam (76) between adjacent grate segments (74) overlies a material discharge fin (77) which is rigidly secured to the interior wall of the drum (24). The fin(s) (77) enable adjoining grate segments (74) to be placed in a side by side relationship in such a way that their side edges (75) are parallel and rest on the inwardly projecting drum wall mounted fin(s) (77).

In use, the rotation of the drum (24) enables the inwardly projecting fins (77) extending from the interior wall surface of the drum (79) to rotate and move material (not shown) that has passed through the grate floor (71) around the periphery of the drum (24) and resides inside the well (35) on the true bottom floor of the drum (24). The material is continuously moved by the fins (77) in a circular path so long as the drum (24) rotates. The material is moved toward the exit chute (68) and dispensed from the drum through an opening in the true floor. The escaping material is carried out of the housing (25) by the conveyor (18) which extends under the housing (25) of the housing (22) to converge with the exit chute (68) (FIG. 1).

A single grate assembly may be used or individual grate segments (74) may be rigidly secured and attached to one another by a variety of conventional means. It is believed best to use a plurality of grate segments (74) with a user selected slat (72) configuration, because the spacing between adjacent slats (72) is the mechanism which determines the particle size of the material escaping the drum (24 (i.e., the processed material "MIF" of FIG. 5.

The removal conveyor (18) preferably has a moving belt (65). Optional agitator bar (78) is secured to the interior wall surface (79) of the drum to urge material placed into the drum for processing and volume reduction to move with the drum as it rotate and eventually come in contact with the rotating wheel (58) secured to the axle assembly (52) via the hub assembly (64) and driven by the motor and shaft combination, (17) and (19) respectively.

Figure 8:
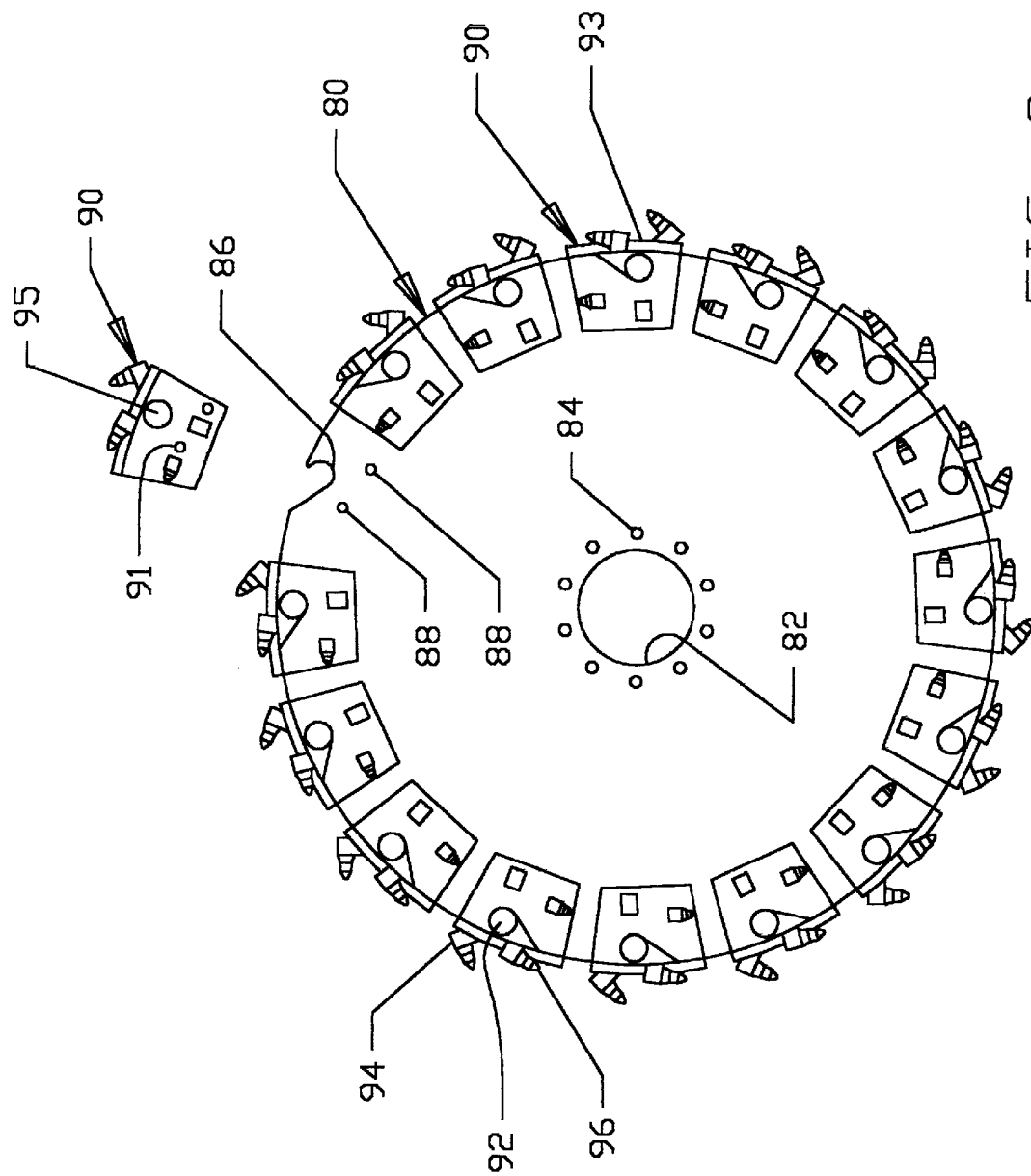
FIG. 8 is a top view of an embodiment of a tooth wheel component of the present invention.
Figure 9:
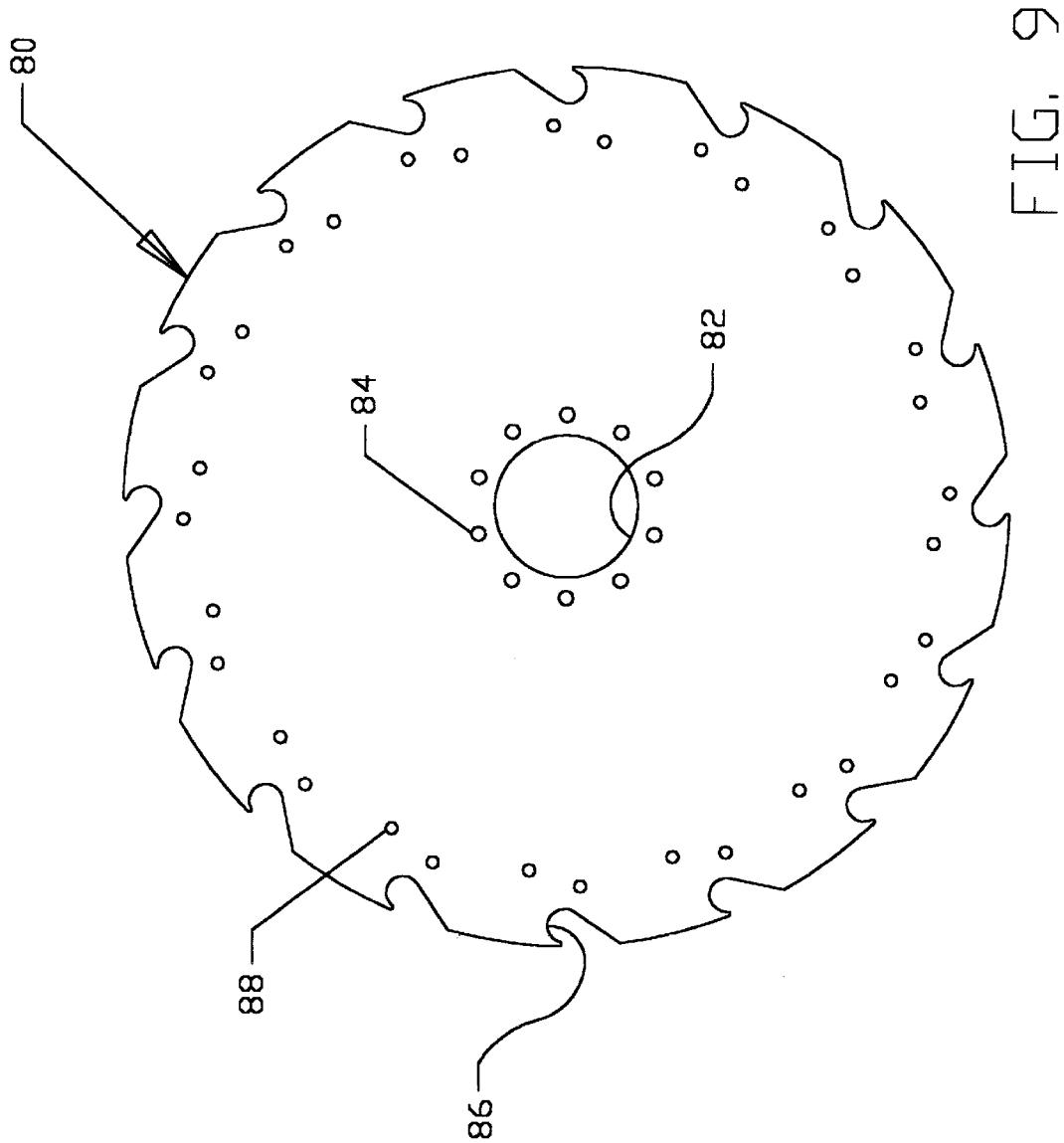
FIG. 9 is a top view of the wheel component shown in FIG. 8 with its brackets and rigid teeth and other components removed therefrom.
Figure 10:
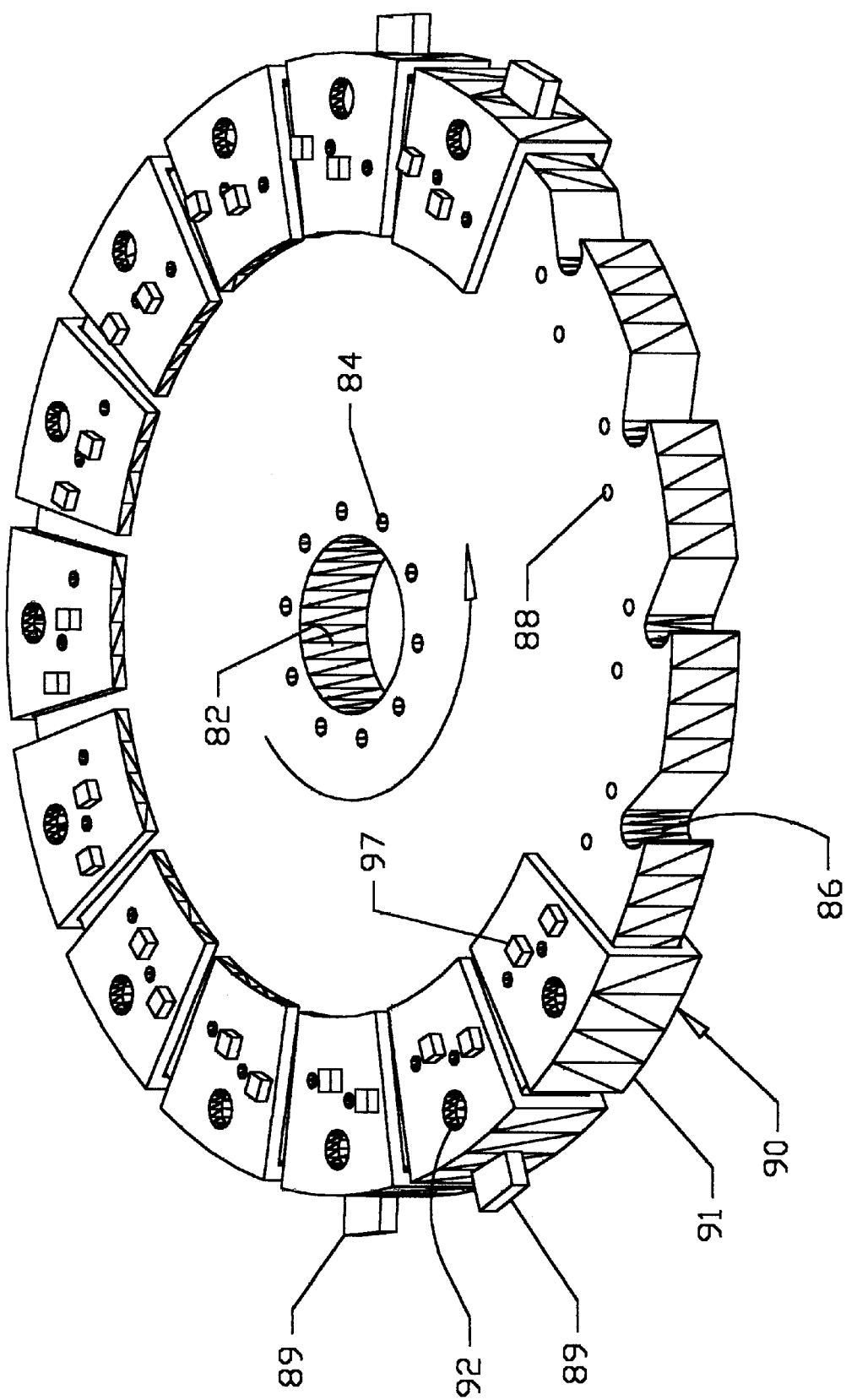
FIG. 10 is an elevated perspective view of an alternate embodiment of the wheel shown in FIG. 8 and FIG. 9.

With reference to FIGS. 8, 9, and 10, an embodiment of the wheel assembly used in conjunction with an embodiment of the present invention is designated in general by the reference numeral 80. Associated with the wheel assembly (80) is a hub receiving orifice (82) surrounded by stud receiving bores (84) which receive the hub assembly (64) and threaded studs (70), respectively. The wheel is secured to the hub via a plurality of nuts or other fasteners (not shown). Also associated with the wheel assembly (80) is a plurality of angled notches (86) formed around its periphery to give it a circular-saw blade look as illustrated best in FIG. 9.

A plurality of bolt-receiving bores (88) are provided to engage the tooth assembly (90) having corresponding compatible bores (91) both of which (88 and 91) receive a conventional fastener (not shown) to secure the tooth assembly and its associated bracket (93) to the wheel periphery. A large diameter pin (92) of a cylindrical configuration is inserted into a large diameter bore (95) of the bracket (93) and occupies the angled notch (86) during operation. In use, the wheel turns in the direction of the angled notch in much the same manner a circular-saw blade would turn when cutting a piece of wood. Attached to the brackets (93) and rigidly secured thereto to prevent movement or adjustability from their desired orientation are a series or plurality of teeth designated generally in FIG. 10 by the reference numeral (89). There are several embodiments of the teeth (89), one of which includes a tooth holder (94) having a removable tooth member (96) removably mounted thereto. Preferably, however, tooth (89) comprises fixed or unitary tooth (97) welded or otherwise rigidly attached to the bracket (93). Bolt shrouds (97), preferably formed of hardened steel or hardened surface welds, are provided to minimize abrasion of the fasteners (not shown) which secure the brackets (93) to the periphery of the wheel.

Figure 11:
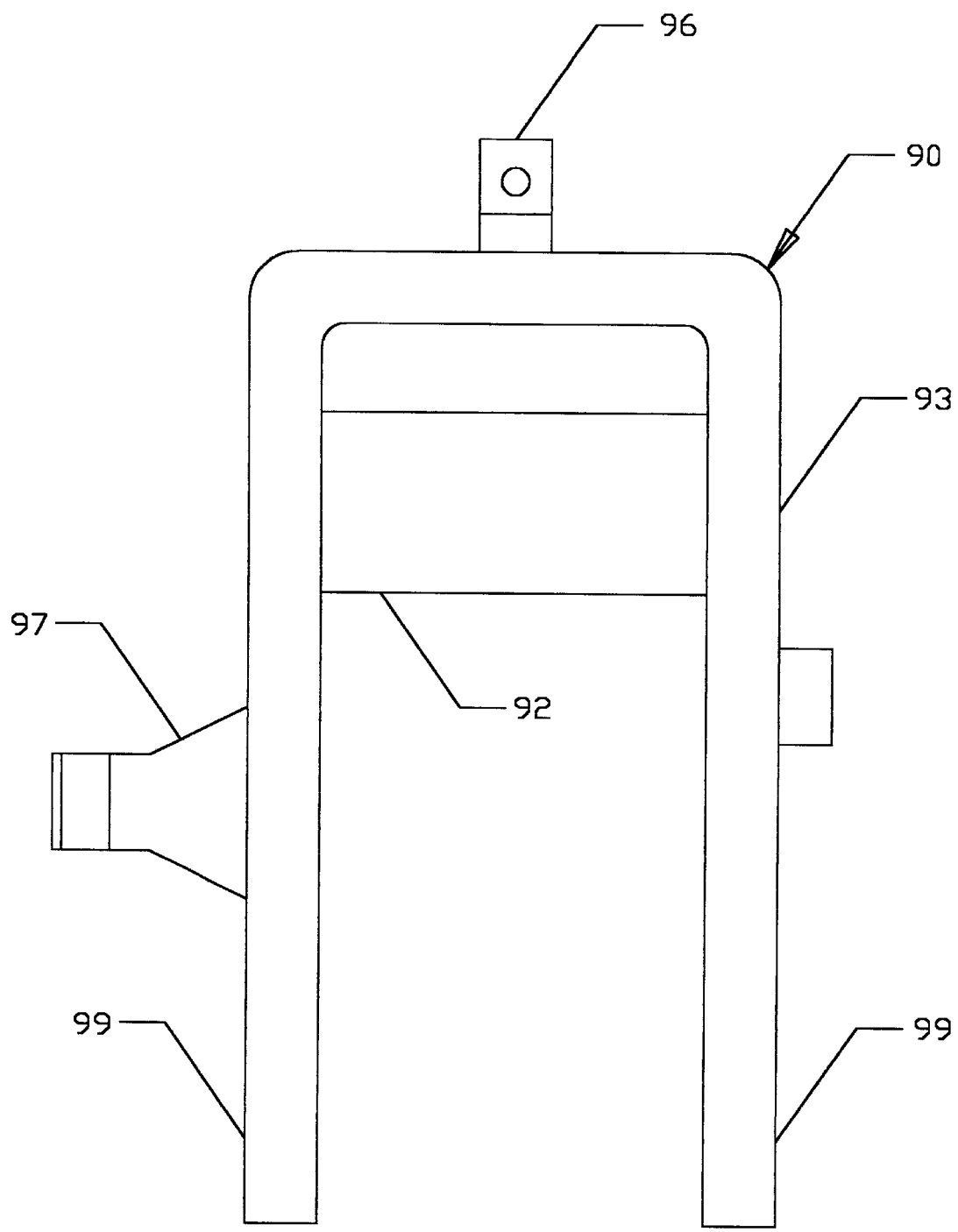
FIG. 11 is an elevated perspective view of an alternate embodiment of a tooth-carrying bracket or tooth assembly of the present invention and further illustrating two alternate embodiments of the tooth components of the present invention, one of which is preferred.
Figure 12:
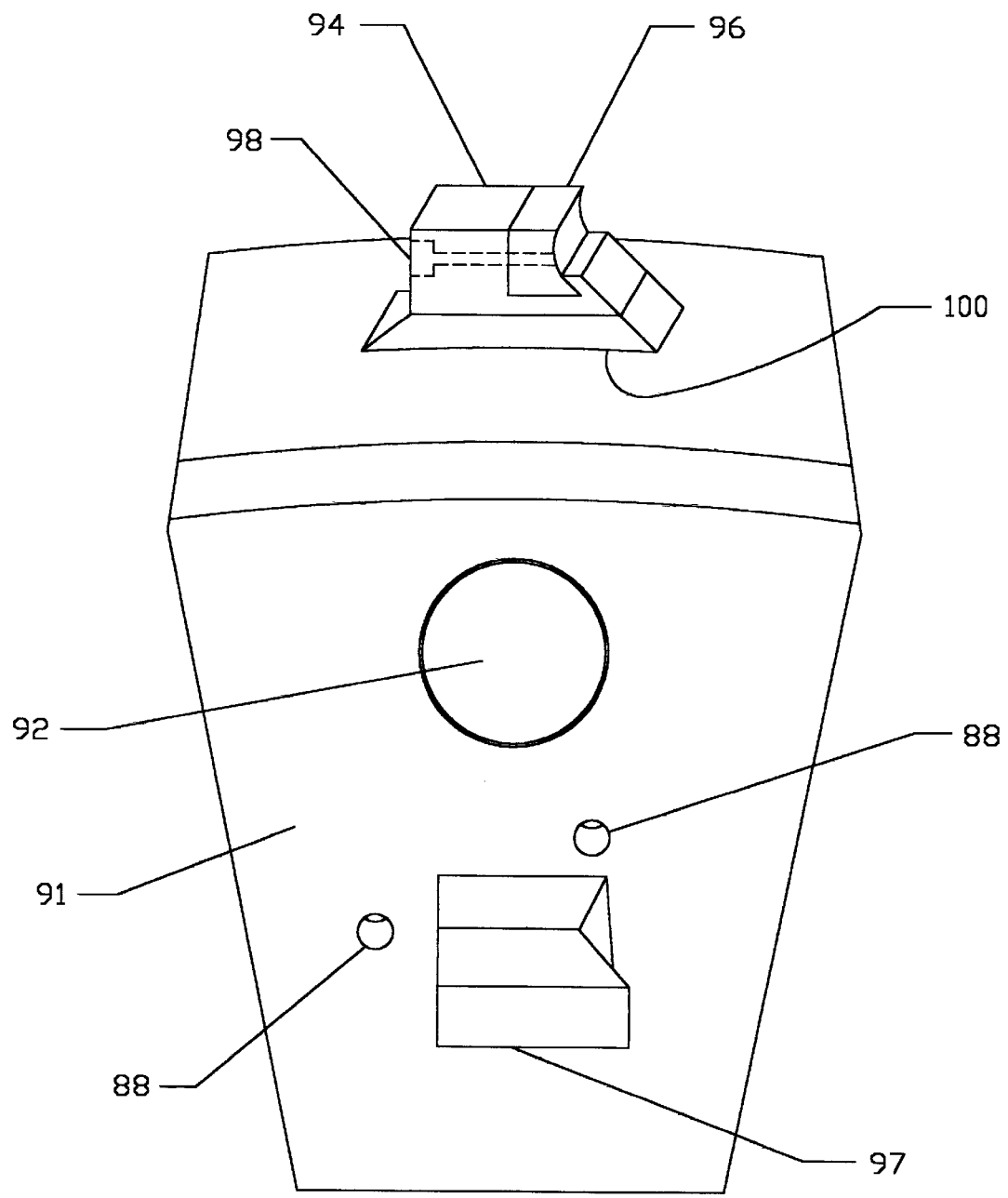
FIG. 12 is an elevated perspective side view of the mechanism illustrated in FIG. 11.

With reference to FIGS. 11 and 12, the modular tooth assembly (90) or teeth (97) are mounted to the brackets (93) which have spaced apart leg components (99) joined by a cross member (101). The pin (92) (mentioned above) is of a length and sized to be positioned therebetween. Tooth holders (94) or teeth (97) are secured to the surface of the legs (99) wherever it is desired preferably by a hard surface weld (100). Removable tooth components (96) are rigidly secured and prevented from adjustability by a bolt attachment (98) through a series of threaded bores which extend from the tooth holder (94) and into the tooth components (96) to provide a secure attachment therebetween and prohibit adjustability thereof which could cause toggling and erratic operation over time.

In use, it is preferred that the drum is either rotated in a left or right direction as viewed from the top, while the wheel assembly (80) turns in an opposite direction, right or left, such that the drum moves material into contact with the wheel (80) during operation.

The direct drive of the present invention is more thoroughly described as a direct transfer of rotational torque from the engine component (17) via the drive shaft assembly (19) which connects to the gear assembly (not shown) located within the bell-housing (54) of the gear assembly (52) whose axle arm (55) extends up through an aperture in the drum floor (24) to receive the wheel assembly (80) or (56) depending on the embodiment. Accordingly, when the drum (24) is rotated and the wheel is rotated via the direct drive and the gear assembly (52), the grate segments (74) rotate with the drum while the center floor portion (66) remains stationary as would be the case due to the positioning of the hub (64) through the floor (66) as best shown in FIG. 7.

These and other embodiments and/or equivalents thereof shall become apparent after consideration of the disclosure and specification, including the drawings and claims, that are presented herein. All such alternate embodiments and/or equivalents thereof are contemplated within the scope of the present invention even though not specifically set forth herein.

What is claimed is:

1. A direct drive material volume reduction apparatus, comprising:

a frame, a motor supported by the frame, a drum supported by the frame and having an interior and an exterior, a drive shaft operably connected to and extending from the motor, a comminuting wheel assembly including a comminuter wheel with a disk like body portion having an axis;

a gear assembly operably interconnected directly between the drive shaft and the comminuting wheel assembly to operably support the comminuting wheel assembly within the interior of the drum wherein the gear assembly transmits the rotational torque of the motor imparted to the drive shaft and directly transfers it to the comminuter wheel assembly enabling the comminuter wheel to rotate within the interior of the drum; and the comminuting wheel assembly further comprises a comminuter wheel with a peripheral edge having at least one notch; and at least one bracket secured to the peripheral edge of the comminuter wheel wherein the at least one bracket further includes a pair of spaced apart leg members and a transverse pin interpositioned between the spaced apart leg members enabling the leg members to straddle the peripheral edge and the pin to be received within the at least one notch when the at least one bracket is operably attached to the comminuter wheel.

2. The material volume reduction apparatus of claim 1, such that the gear assembly comprises:

a geared axle assembly of a motorized vehicle.

3. The geared axle assembly of a motorized vehicle of the material volume reduction apparatus of claim 2, further comprising:

a rear geared axle assembly of a motorized vehicle having rear wheel drive.

4. The rear geared axle assembly of a motorized vehicle having rear wheel drive of the material volume reduction apparatus of claim 3, further comprising:

a rear geared axle assembly of a truck.

5. The material volume reduction apparatus of claim 1, such that the drum further comprises:

a substantially cylindrical wall with an open first end and an open second end; and a closure member to at least partially close the second end of the drum.

6. The material volume reduction apparatus of claim 5, such that the closure member further comprises:

a grate mounted adjacent the second end of the drum.

7. The grate of the material volume reduction apparatus of claim 6, further comprising:

a plurality of individual grate segments.

8. The material volume reduction apparatus of claim 1, such that the gear assembly further comprises:

a hub supported by a distal end of an axle portion wherein the hub is configured to enable the comminuter wheel to be attached to it.

9. The hub of the material volume reduction apparatus of claim 8, further comprising:

at least one stud extending therefrom and configured to receive a fastener; and the comminuter wheel has at least one bore extending through the disk like body portion parallel to the axis thereof and configured to enable the at least one stud to be received within the bore and accept a fastener to secure the comminuter wheel interpositionally between the hub and the fastener.

10. The at least one bracket of the material volume reduction apparatus of claim 1, further comprising:

a pair of spaced apart leg members joined together by a cross member.

11. The at least one bracket of the material volume reduction apparatus of claim 1, further comprising:

at least one tooth element.

12. The material volume reduction apparatus of claim 11, such that the at least one tooth element comprises:

a unitary body construction wherein the unitary body is rigidly secured to the bracket.

13. The material volume reduction apparatus of claim 11, such that the at least one tooth element comprises:

a modular tooth component.

14. The material volume reduction apparatus of claim 1, wherein:

the drum is rotatably supported by the frame.

15. The material volume reduction apparatus of claim 1, such that:

the comminuter wheel further includes a plurality of notches formed in the peripheral edge of the wheel.

16. The at least one bracket of the material volume reduction apparatus of claim 15, further comprising:

a plurality of brackets attached to the peripheral edge of the comminuter wheel.

17. The material volume reduction apparatus of claim 1 further comprising:

at least one bolt used to secure the at least one bracket to the comminuting wheel.

18. The material volume reduction apparatus of claim 1, such that:

the at least one notch is angled in a direction extending from the peripheral edge toward the axis of the wheel; and the pin is sized to be received within the at least one angled notch.

19. A shaft drive material volume reduction apparatus, comprising:

a frame, a gear assembly supported by the frame and having a hub extending therefrom;

drive means for imparting a rotational torque to the gear assembly enabling the hub to rotate thereon;

a drum supported by the frame and having an interior and an exterior;

a comminuting wheel assembly operably attached to the hub and further comprising a comminuter wheel with a disk like body portion having a central axis;

the drive means includes a motor and a drive shaft extending from the motor wherein the drive shaft is directly connected to the gear assembly enabling the torque imparted to the drive shaft directly from the motor to be transferred directly to the gear assembly enabling the hub and comminuting wheel to rotate within the interior of the drum;

the comminuter wheel further comprises a peripheral edge having at least one notch and at least one bracket having a pair of spaced apart leg members and a transverse pin interpositioned between the spaced apart leg members wherein the at least one bracket is configured to be secured to the peripheral edge of the wheel so as to enable the spaced apart leg members to straddle the peripheral edge of the comminuter wheel and the pin to be received within the at least one notch during use; and at least one tooth element attached to at least one of the at least one bracket.

20. The material volume reduction apparatus of claim 19, such that the gear assembly comprises:

a geared axle assembly of a motorized vehicle.

21. The geared axle assembly of a motorized vehicle of the material volume reduction apparatus of claim 20, further comprising:

a rear geared axle assembly of a motorized vehicle having rear wheel drive.

22. The rear geared axle assembly of a motorized vehicle having rear wheel drive of the material volume reduction apparatus of claim 21, further comprising:

a rear geared axle assembly of a truck.

23. The material volume reduction apparatus of claim 19, such that the drum further comprises:

a substantially cylindrical wall with an open first end and an open second end; and a closure member to at least partially close the second end of the drum.

24. The material volume reduction apparatus of claim 23, such that the closure member further comprises:

a grate mounted adjacent the second end and interior of the drum.

25. The grate of the material volume reduction apparatus of claim 24, further comprising:

a plurality of individual grate segments supported in a side by side relationship within the interior of the drum.

26. The hub of the material volume reduction apparatus of claim 19, further comprising:

at least one stud extending therefrom and configured to receive a fastener; and the comminuter wheel has at least one bore extending through the disk like body portion parallel to the axis thereof and configured to enable the at least one stud to be inserted into the bore and receive a fastener thereby securing the comminuter wheel interpositionally between into the hub and the fastener.

27. The at least one bracket of the material volume reduction apparatus of claim 19, wherein:

the pair of spaced apart leg members are joined together by a cross member which overlies the peripheral edge of the comminuter wheel when the leg members straddle the edge of the comminuter wheel.

28. The material volume reduction apparatus of claim 19, such that:

the comminuter wheel further includes at least one notch formed in the peripheral edge; and the at least one bracket further includes a transverse pin interpositioned between the spaced apart leg members wherein the pin is sized to be received within the at least one notch when the spaced apart leg members straddle the peripheral edge of the wheel.

29. The material volume reduction apparatus of claim 28, such that:

the at least one notch is angled in a direction extending from the peripheral edge toward the central axis of the wheel; and the pin is sized to be received within the at least one angled notch.

30. The material volume reduction apparatus of claim 19, such that the at least one tooth element comprises:

a unitary body construction wherein the unitary body is rigidly secured to the bracket.

31. The material volume reduction apparatus of claim 19, such that the at least one tooth element comprises:

a modular tooth component.

32. The material volume reduction apparatus of claim 19, wherein:

the drum is rotatably supported by the frame.

33. A direct drive material volume reduction apparatus, comprising:

a motor, a drive shaft operably connected to the motor, a comminuting assembly including a comminuter wheel having a disk like body portion with a peripheral edge which includes a plurality of angled notches formed therein;

a gear assembly operably interpositioned between and connected to the drive shaft and the comminuting wheel enabling the motor to impart a rotational torque to the drive shaft which actuates the gear assembly to turn the comminuter wheel; and wherein the plurality of angled notches are spaced apart around the peripheral edge of the disk like body of the comminuter wheel enabling the comminuter wheel to take the appearance of a circular saw blade.

34. The direct drive material volume reduction apparatus of claim 33, further comprising:

a plurality of brackets each having a transverse pin interpositioned between a pair of spaced apart leg members wherein the pin of any bracket is sized to be received within any one of the plurality of angled notches at the same time the spaced apart leg members straddle the peripheral edge of the wheel when a bracket is operably attached to the comminuter wheel.

\* \* \* \* \*